A. Myers,
Removing Tape Worms.
Nº 11,942.   Patented Nov. 14, 1854.
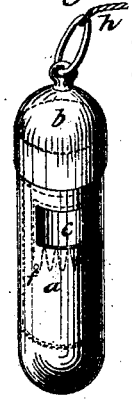
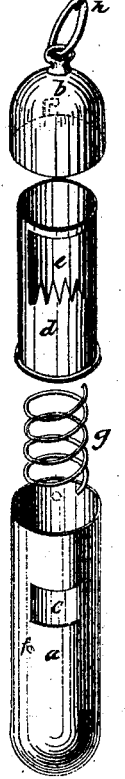
Witnesses:
S. H. Walls
J. W. Hamilton
Inventor:
Alpheus Myers

UNITED STATES PATENT OFFICE.

ALPHEUS MYERS OF LOGANSPORT, INDIANA.

TAPEWORM-TRAP.

Specification of Letters Patent No. 11,942, dated November 14, 1854.

*To all whom it may concern:*

Be it known that I, ALPHEUS MYERS, M. D., of Logansport, in the county of Cass and State of Indiana, have invented a new and useful Trap for Removing Tapeworms from the Stomach and Intestines; and I do hereby declare that the following is a full, clear, and exact description of the same, reference being had to the accompanying drawings, forming part of this specification.

The object of my invention is to effect the removal of worms from the system, without employing medicines, and thereby causing much injury.

My invention consists in a trap which is baited, attached to a string, and swallowed by the patient after a fast of suitable duration to make the worm hungry. The worm seizes the bait, and its head is caught in the trap, which is then withdrawn from the patient's stomach by the string which has been left hanging from the mouth, dragging after it the whole length of the worm.

Figure 1, in the accompanying drawing, is a view, on an enlarged scale, of the trap in condition to be swallowed by the patient. Fig. 2, is a view of all the parts of the same detached.

Similar letters of reference indicate corresponding parts in both figures.

The trap consists of a box $a$, of gold, platina or other metal not easily corroded, of cylindrical form with a rounded bottom, having a cover or cap $b$, of rounded form which fits to it, and is secured by a bayonet fastening or other means. The length of the box and cap, may be about three quarters of an inch, and the diameter about one quarter of an inch. In one side of the box in the upper part near the cover, there is an opening $c$, of a sufficient size for the head of the worm to be introduced. This box contains another box $d$, of substantially similar form fitting loosely to it; and the box $d$, has an opening $e$, within it of about the same width as the opening $c$, in the outer box, the said opening $e$, having its lower edge serrated. The box $a$, is furnished inside with a stud $f$, dotted in both figures, which projects very slightly from the inner surface, so as to be capable of catching between the teeth of the lower edge of the opening $e$, as shown in Fig. 1, in dotted outline. Under the bottom of the box $d$, is a spiral spring $g$, which tends to force it upward within the outer box.

The trap is baited by taking off the cover $b$, of the exterior box, and filling the interior box with the bait which may consist of any nutritious substance. The interior box $d$, is then pushed down until the stud $f$, catches between the teeth of the opening $e$, and holds it with the openings $e$, and $c$, opposite each other, the points of the teeth being then below the lower edge of the opening $c$. The trap, having the cord $h$, attached to a ring $i$, on the lid is then swallowed. The worm, in inserting its head at the opening $e$, and eating the bait, will so far disturb the inner box as to work it free of the stud $f$, when the box will be forced upward by the spring $g$, and the worm caught behind the head, between the serrated lower edge of the opening in the interior box, and the upper edge of the opening in the exterior box. The trap and the worm may then be drawn from the stomach, by the cord $h$.

In constructing the trap, care should be taken that the spring $g$, is only strong enough to hold the worm, and not strong enough to cause his head to be cut off.

What I claim as my invention, and desire to secure by Letters Patent, is:—

A trap for the removal of tape worms from the stomach and intestines, constructed and operating substantially as herein described.

ALPHEUS MYERS.

Witnesses:
S. H. WALES,
J. W. HAMILTON.